Oct. 31, 1933.  H. SCHLAICH  1,933,453
INDICATING DEVICE RESPONSIVE TO TEMPERATURE AND
PRESSURE FOR INTERNAL COMBUSTION ENGINES
Filed Dec. 20, 1928  2 Sheets-Sheet 1

INVENTOR
*Herman Schlaich.*
BY
*Moses & Nolte*
ATTORNEYS

Oct. 31, 1933.    H. SCHLAICH    1,933,453
INDICATING DEVICE RESPONSIVE TO TEMPERATURE AND
PRESSURE FOR INTERNAL COMBUSTION ENGINES
Filed Dec. 20, 1928    2 Sheets-Sheet 2
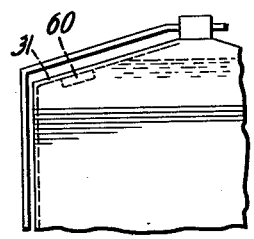
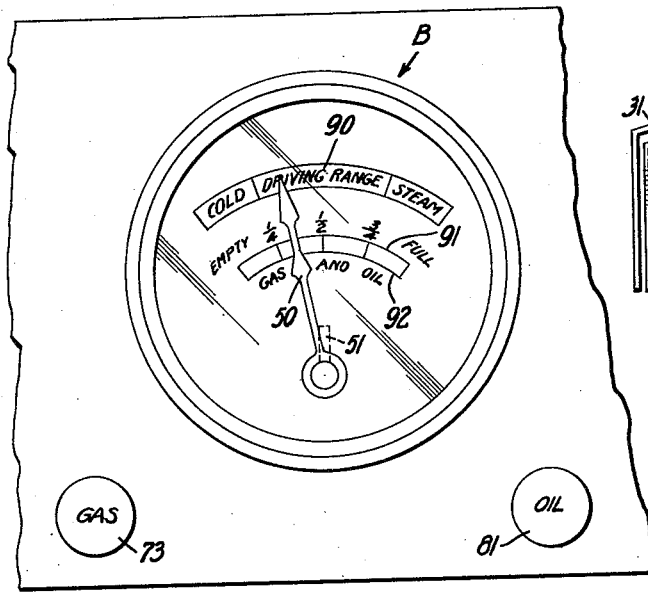
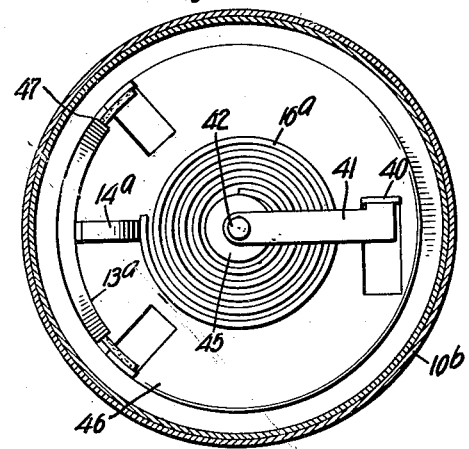
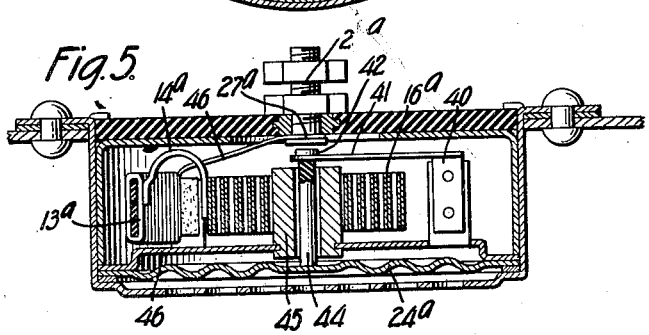
INVENTOR
*Herman Schlaich.*
BY *Moses & Nolte*
ATTORNEYS Patented Oct. 31, 1933

1,933,453

UNITED STATES PATENT OFFICE 1,933,453

INDICATING DEVICE RESPONSIVE TO TEMPERATURE AND PRESSURE FOR INTERNAL COMBUSTION ENGINES

Herman Schlaich, Long Island City, N. Y.

Application December 20, 1928
Serial No. 327,449

13 Claims. (Cl. 177—351)

My present invention relates to improvements in instruments for indicating the thermal condition of the cooling system of an internal combustion engine, particularly those for use in automotive vehicles. In general, it is an object of my invention to provide such an instrument which will have an indicating member which is actuated both by temperature and by pressure effects within the cooling system whereby, for example, the indicating member is actuated by a temperature effect to show temperature conditions therein and is further actuated to show a condition of more or less active boiling of the cooling liquid by the effect of the vapor pressure of such liquid. A more specific object is to provide such an instrument the indicating portion of which is adapted to be mounted at a point distant from the cooling system, as for example on the dash of an automotive vehicle. A further object is to provide such an instrument which shall be electrically operated.

My invention will be best understood by reference to the detailed description taken with the annexed drawings, in which, Figure 1 is a sectional view of a preferred embodiment of my invention consisting of an electrical instrument responsive both to temperature and pressure effects;

Figure 5 is a sectional view of a further modification;

Figure 6 is a plan view of the device shown in Figure 5;

Figure 7 is a view showing a preferred location of the combined pressure and temperature responsive instrument illustrated in the preceding figures;

Figure 8 is a view of an electrical indicating instrument proper which is adapted to be actuated by any one of a plurality of change responsive devices, as for example those showing the thermal condition of the cooling system, the gasoline level and the oil level.

Figure 2:
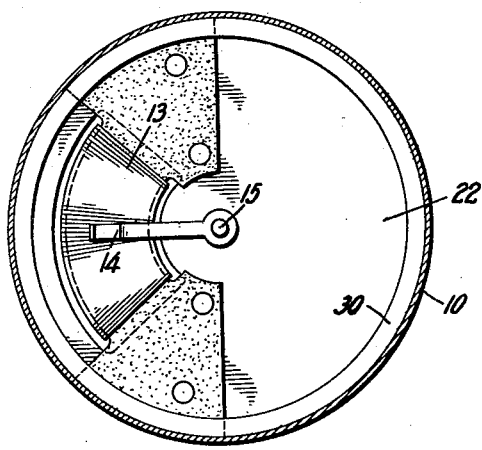
Figure 2 is a plan view of said embodiment.
Figure 1:
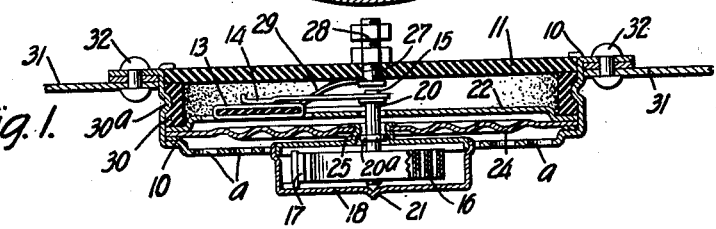

Describing now the combined temperature and pressure responsive instrument and referring particularly to Figures 1 and 2, 10 denotes a frame of the instrument which is in more or less a form of a cap having perforations $a$ and having a cover portion 11 of insulating material. As shown, an electrical resistor in the form of a coil 13 is provided whose effective resistance is to be varied by the effects to be measured and will be connected to the actuating mechanism of the indicator proper, Figure 8 in a manner which will be apparent. Cooperating with coil 13 is a wiper 14 which preferably is actuated by means of a temperature responsive element in the form of a bimetallic coil 16. Coil 16 has a fixed end 17 which is anchored to a housing 18, as shown, and a free end which is attached to a spindle 20 to which the remote end of wiper 14 is attached. The mounting for spindle 20 is constituted of a central cusp 21 in cap 18, to be subsequently referred to, and a collar 20a cooperating with an aperture in a plate 22 mounted in frame 10 which plate also bears coil 13.

The pressure actuated part of the instrument comprises a diaphragm 24 in which is provided the cap or casing 18 which depends from a neck 25 and forms an air-tight housing for the bimetallic coil 16, as shown. In the embodiment shown the function of diaphragm 24, is, upon actuation by an excessive pressure outside thereof, to break the circuit, resistance of which is varied by the wiper 14 (the effect of an increase in temperature being to cause wiper 14 to cut out the resistance) whereby the effect of the pressure actuation will be as if wiper 14 were continued to the end of 13 having zero resistance. This action of the diaphragm 24 is had owing to the contact 27 constituting the end of a binding post 28 which is connected by means of conductor 29 to the zero resistance end of resistor 13, it being evident that pressure on said diaphragm will be effective to move the end 15 of wiper 14 borne by spindle 20 against the contact 27. Since spindle 20 is grounded, the effect will be to short circuit the resistance 13. The assembly of the forementioned elements is completed by means of a retaining ring 30 of insulating material which is held in place by means of beading 30a projecting into the casing afforded by frame 10. The latter is adapted to be secured to the element 31 to which it is to be attached by means of rivets 32. As will be evident from Figures 1 and 2, bearing plate 22 is also utilized to contain the resistor coil 13.

As will be evident hereinafter, cutting out resistance in element 13 causes the pointer of the dial, shown in Figure 8, to move to the right thus indicating the temperature. Figure 7 shows a preferred location of the temperature and pressure responsive instrument denoted by 60, and as seen from this figure, said element will be submerged in the cooling liquid and will therefore give an exact indication of the temperature of the cooling liquid. The instrument is preferably so adjusted that the temperature effect of the boiling of the liquid will move the wiper 14 an insufficient distance to bring it to the end of zero resistance of the resistor 13 so that when a more or less vigorous boiling of the cooling liquid takes place the steam pressure generated will actuate the diaphragm 22 to completely cut out all resistance in resistor 13 thereby giving the pointer of the indicating instrument a quick jump and bringing it to the end point of the scale.

Figure 4:
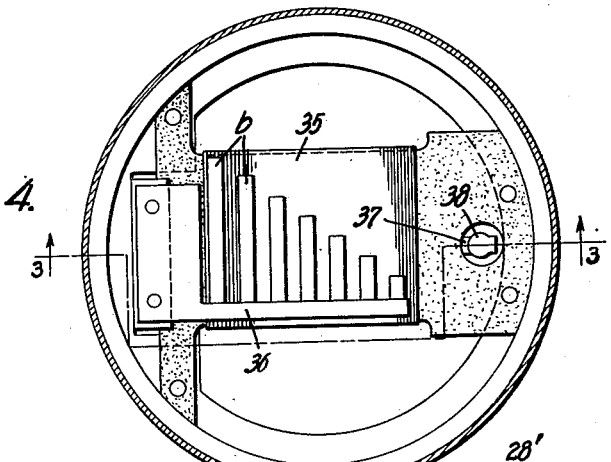
Figure 4 is a plan view of the instrument as shown in Figure 3.
Figure 3:
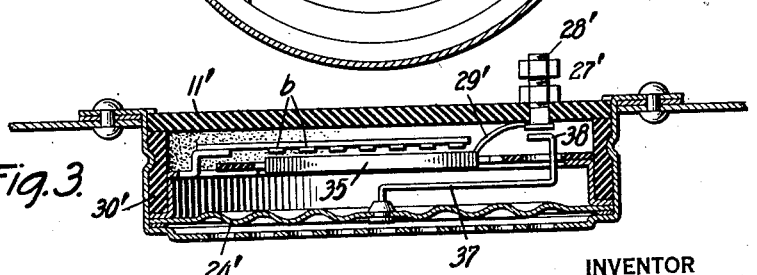
Figure 3 is a sectional view of a modified pressure and temperature device.

Figures 3 and 4 illustrate a modification of the construction of the combined temperature and pressure responsive instrument. In this case a resistor coil 35 is provided similar to coil 13 of Figure 1. In lieu of a bimetallic element in the form of a coil, however, I have provided such an element 36 having a plurality of upstanding fingers $b$ of graduated height, such fingers being formed of bimetallic material and by virtue of their graduated size each having a higher temperature of actuation as their height diminishes Said element 36 being grounded, when a finger $b$ contacts against the coil 35, the effect is to cut out resistance up to such point of contact. As in the preceding embodiment, a diaphragm 24' is provided and has an arm 37 affixed thereto so that when such diaphragm is actuated the end of said arm 38 will press against contact 27' of binding post 28' and thereby short circuit the coil 25.

In Figures 5 and 6 I have illustrated a still further modification in which the bimetallic coil 16$a$ is mounted within the diaphragm and has a free end connected to a wiper 14$a$ contacting with a resistor coil 13$a$ the other end of said coil 16$a$ being fixed to an annular support 45. A post 40 which is grounded has a spring arm 41 which bears a contact piece 42 opposite contact piece 27$a$ of binding post 28$a$. Diaphragm 24$a$ has connected thereto a centrally disposed stud 44 which passes through annular support 45 connected to a bearing plate 46 which support 45 holds the bimetallic coil 16$a$ in place as above indicated. Current from a battery, not shown, flows to binding post 28$a$ and thence by means of a conductor 46 to an end 47 of resistor coil 13$a$, thence through said resistor coil to wiper 14$a$ and thence to the grounded frame 10$b$. When the diaphragm is actuated current through binding post 28$a$ passes through arm 41 to the frame and thereby coil 13$a$ is short circuited.

Any of the well known types of indicating instruments may be used in connection with the described heat responsive devices. In Fig. 8 I have illustrated a face view of such an indicator having a pivoted pointer 50 to be actuated as usual by electromagnetic means at the back of the dial, the coils of the electromagnets being connected up in circuit in known manner with the above described variable resistance means.

In use, the temperature actuation will indicate with considerable accuracy the temperature of the cooling liquid. As the instrument is adjusted however, the temperature effect, even of boiling, will not be sufficient to move the indicator for its entire movement. When, however, the condition of overheating is sufficient for the liquid to boil vigorously enough to generate a slight excess pressure (which will occur due to the fact that the overflow pipe connecting the air space of the radiator with the outside will be of insufficient capacity to prevent such excess pressure from building up) such excess of pressure will actuate the diaphragm to move the indicator 50 for substantially its entire movement.

In the case of the ordinary temperature indicating instrument which is mounted in the radiator cap, the temperature responsive portion of which is above the cooling liquid, a decided advantage is obtained that upon boiling a quick rise of the indicator is had, this being effective to catch the attention of the operator to warn him of the overheated condition of the cooling system. A slight drawback to said cap instrument, however, is that until boiling is reached the thermometer does not indicate accurately the water temperature due to the lag between same and the temperature of the air space surrounding the temperature responsive instrument. In the present invention, however, it will be evident that I obtain the advantages of both the dash and cap types of temperature indicating instruments since when boiling has taken place, due to the pressure actuated portion, the indicator is given a further and quick movement across a portion of the scale thereby giving further warning of the dangerous condition. Prior to such actuation the indicating instrument has given a substantially accurate indication of the temperature of the cooling liquid.

A further advantage of the form of actuating devices of Figures 1 to 6 resides in this: The ordinary pressure operated instrument, as a rule, is seldom operated, so that the instrument may get out of order without the person driving the automobile becoming conscious of the fact. However, this situation does not obtain in the case of a temperature actuated device. It is continually operated, and is frequently observed by the driver, so that any failure of the instrument is apt to be quickly noted. In the present device, the temperature and pressure devices comprise the same electrical circuit, so that any impairment of the pressure device affecting the circuit will be quickly apparent to the driver of the car because of the resulting failure of the temperature responsive indicator. Assurance is thus had that reliance will not be put upon the pressure operated indicator at a time when it is, in fact, out of order.

It will be evident that various changes may be made in the embodiments specifically described without departing from the spirit of my invention or the scope of the appended claims. It will also be evident that the principle of having a single indicating member actuated by both temperature and pressure effects, which member is remote from the actuating means, may be applied to systems other than those depending upon the use of electric current, and it is my intention to claim my invention broadly to cover such other systems.

What I claim is:

1. In an automotive vehicle, an internal combustion engine having a cooling system employing a cooling liquid, a visual indicator having a movable index mounted apart from said cooling system in combination with temperature responsive means in said system and electrically connected to said indicator for actuating said indicator for a portion only of its movement and pressure responsive means in said system for actuating said indicator for a further portion of its movement.

2. In an automotive vehicle, an internal combustion engine having a cooling system employing a cooling liquid, a visual indicator having a movable index mounted apart from said cooling system in combination with temperature responsive means in said system for actuating said indicator to show the temperature therein and pressure responsive means in said system and electrically connected to said indicator for actuating said indicator to give a quick movement of the indicator in the direction of greater temperature.

3. In an automotive vehicle, an internal combustion engine having a cooling system employing a cooling liquid, a visual indicator having a movable index mounted apart from said cooling system comprising a member responsive to variations of an electric current, in combination with means responsive to temperature changes in said system for varying said current to move said indicator for a portion only of its movement and means responsive to changes of pressure in said system for varying said current to move said indicator a further portion of its movement.

4. In an automotive vehicle, an internal combustion engine having a cooling system employing a cooling liquid, a visual indicator having a movable index mounted apart from said cooling system comprising a member responsive to variations in an electric current, in combination with means beneath the normal level of the cooling liquid responsive to temperature changes in said system for varying said current to move said indicator for a portion only of its movement and means responsive to changes of pressure in said system for varying said current to move said indicator a further portion of its movement.

5. In an automotive vehicle, an internal combustion engine having a cooling system employing a cooling liquid, said system also having a radiator, a visual indicator having a movable index mounted apart from said radiator and comprising a member responsive to variations in an electric current, in combination with means mounted upon the inside upper surface of said radiator and below the normal liquid level therein in combination with means responsive to temperature changes in said system for varying said current to move said indicator for a portion only of its movement and means responsive to changes of pressure in said system for varying said current to move said indicator a further portion of its movement.

6. In an internal combustion engine propelled vehicle, an indicating system for indicating the thermal condition of the engine cooling system which employs a cooling liquid, a visual indicator having a movable index, means including an electric circuit for actuating same, a resistor associated with said circuit, means for varying the resistance of said resistor to give a temperature indication of said indicator and pressure responsive means in said system to vary the resistance of said resistor an amount sufficient to give a quick jump of said indicator.

7. In an internal combustion engine propelled vehicle, an indicating system for indicating the thermal condition of the engine cooling system which employs a cooling liquid, a visual indicator having a movable index, means including an electric circuit for actuating same, a resistor in said circuit, temperature responsive means in said system comprising a bimetallic element for varying the resistance of said resistor to give a temperature indication of said indicator and pressure responsive means in said system for varying the resistance in said resistor an amount sufficient to give a quick jump of said indicator.

8. In an internal combustion engine propelled vehicle, an indicating system for indicating the thermal condition of the engine cooling system which employs a cooling liquid, a visual indicator having a movable index, means including an electric circuit for actuating same, a resistor associated with said circuit, means for varying the resistance of said resistor to give a temperature indication of said indicator and pressure responsive means including a diaphragm in said system to vary the resistance of said resistor an amount sufficient to give a quick jump of said indicator.

9. In an internal combustion engine propelled vehicle, an indicating system for indicating the thermal condition of the engine cooling system which employs a cooling liquid, a visual indicator having a movable index, means including an electric circuit for actuating same, a resistor in said circuit, temperature responsive means in said system acting to cut out resistance in said resistor as the temperature rises, such cutting out of resistance being effective to move said indicator to denote an increase in temperature, and pressure responsive means cutting out sufficient resistance to give a quick jump of said indicator.

10. In an automotive vehicle, an internal combustion engine having a cooling system employing a cooling liquid, a visual indicator mounted apart from said cooling system and means electrically connected to said indicator and responsive to pressure in said system greater than a predetermined pressure due to boiling of said liquid for actuating said indicator and means responsive to temperature conditions in said system for giving different indication by said indicator when the pressure in the system is below said predetermined degree.

11. In an automotive vehicle, an internal combustion engine having a cooling system employing a cooling liquid, a visual indicator responsive to variations in an electric current and means responsive to the temperature when the pressure is below a predetermined pressure due to boiling of said liquid and means responsive to pressure effects in said cooling system greater than said predetermined pressure to vary said current to actuate said indicator to give different indication.

12. In an automotive vehicle, a device for indicating thermal conditions in the engine cooling system, a visual indicator mounted apart from said cooling system, thermal responsive means for actuating said indicator comprising temperature responsive means and pressure responsive means, each of which is capable of electrically actuating said indicator to give different indication, said pressure responsive means comprising a diaphragm forming a part of the housing enclosing said temperature responsive means, whereby said diaphragm also serves to conduct heat to said temperature responsive means.

13. In an automotive vehicle, an indicating system for indicating the thermal condition of the engine cooling system which employs a cooling liquid, a visual indicator having a movable index, means including an electric circuit for actuating same, a resistor associated with said circuit, means for varying the resistance of said resistor to give a temperature indication of said indicator, pressure responsive means in said system and arranged so that movement of same acts to short-circuit said resistor and to cause a quick jump of said indicator.

HERMAN SCHLAICH.